(12) United States Patent
Gredegård et al.

(10) Patent No.: US 8,837,931 B2
(45) Date of Patent: Sep. 16, 2014

(54) TREND-BASED TEMPERATURE COMPENSATION FOR A MONITORING DEVICE

(71) Applicant: Axis AB, Lund (SE)

(72) Inventors: Henning Gredegård, Lund (SE); Björn Östby, Lund (SE)

(73) Assignee: Axis AB, Lund (SE)

( * ) Notice: Subject to any disclaimer, the term of this patent is extended or adjusted under 35 U.S.C. 154(b) by 11 days.

(21) Appl. No.: 13/630,092

(22) Filed: Sep. 28, 2012

(65) Prior Publication Data

US 2014/0093228 A1 Apr. 3, 2014

(51) Int. Cl.
*G03B 13/00* (2006.01)
*G02B 7/02* (2006.01)

(52) U.S. Cl.
CPC ..................................... *G02B 7/028* (2013.01)
USPC ........................................................... 396/97

(58) Field of Classification Search
CPC ...................................................... G02B 7/028
USPC ............................................................. 396/84
See application file for complete search history.

(56) References Cited

U.S. PATENT DOCUMENTS

| 5,412,448 | A | 5/1995 | Kunishige |
| 6,822,688 | B2 | 11/2004 | Ohta |
| 7,925,148 | B2 | 4/2011 | Choi et al. |
| 8,040,622 | B1 | 10/2011 | Schuster et al. |
| 8,400,500 | B2 * | 3/2013 | Hirata .............................. 348/68 |
| 2006/0170813 | A1 * | 8/2006 | Morofuji ....................... 348/345 |
| 2008/0152334 | A1 * | 6/2008 | Choi et al. ...................... 396/97 |
| 2009/0284722 | A1 * | 11/2009 | Gabor et al. .................... 355/53 |
| 2010/0141802 | A1 * | 6/2010 | Knight et al. .............. 348/240.3 |
| 2011/0292525 | A1 | 12/2011 | Ando et al. |

FOREIGN PATENT DOCUMENTS

JP 2005-077435 A 3/2005

* cited by examiner

*Primary Examiner* — Clayton E Laballe
*Assistant Examiner* — Noam Reisner
(74) *Attorney, Agent, or Firm* — Snyder, Clark, Lesch & Chung, LLP

(57) ABSTRACT

A method, performed by a monitoring device, may include detecting a temperature change, greater than a temperature change threshold, from a previous temperature to a current temperature; retrieving a trend-based motor position setting for a focus motor from a trend statistics memory based on the current temperature; and selecting a starting motor position setting for the focus motor based on the retrieved trend-based motor position setting or a current motor position setting. The method may further include performing a just noticeable difference modification on the focus motor using the selected starting motor position setting, wherein the just noticeable difference corresponds to a change in a motor position setting that results in a perceivable change in a focus level of the monitoring device, and selecting a temperature adjusted motor position setting for the focus motor based on a result of the just noticeable difference modification.

20 Claims, 8 Drawing Sheets

TREND-BASED TEMPERATURE COMPENSATION FOR A MONITORING DEVICE

BACKGROUND INFORMATION

A monitoring device, such as, for example, a camera, may be installed to capture images of an area of interest. When a technician installs the monitoring device, the technician may configure the monitoring device to be focused on a particular object, or a particular aspect, in the area of interest. The monitoring device may be focused by adjusting a front focus and a back focus. The front focus may depend on the distance from a lens to an object, or aspect, of the area of interest. The back focus may depend on the distance between a lens and a sensor area of the monitoring device that captures images of the area of interest. It may be desirable to keep the focus set during installation to be as stable as possible. Changes in the environment may affect the back focus, by, for example, moving optical elements and/or sensor elements of the monitoring device. Therefore, the back focus may need to be compensated based on changes in the environment.

SUMMARY OF THE INVENTION

According to one aspect, a method, performed by a monitoring device, may include detecting, by the monitoring device, a temperature change, greater than a temperature change threshold, from a previous temperature to a current temperature; retrieving, by the monitoring device, a trend-based motor position setting for a focus motor from a trend statistics memory based on the current temperature; selecting, by the monitoring device, a starting motor position setting for the focus motor based on the retrieved trend-based motor position setting or a current motor position setting; performing, by the monitoring device, a just noticeable difference modification on the focus motor using the selected starting motor position setting, wherein the just noticeable difference corresponds to a change in a motor position setting that results in a perceivable change in a focus level of the monitoring device; and selecting, by the monitoring device, a temperature adjusted motor position setting for the focus motor based on a result of the just noticeable difference modification.

According to another aspect, a monitoring device may include a focus lens configured to focus an image onto a sensor area; a focus motor configured to adjust the focus lens; and logic configured to detect a temperature change, greater than a temperature change threshold, from a previous temperature to a current temperature; retrieve a trend-based motor position setting for the focus motor from a memory based on the current temperature; select a starting motor position setting for the focus motor based on the retrieved trend-based motor position setting or a current motor position setting; perform a just noticeable difference modification on the focus motor using the selected starting motor position setting, wherein the just noticeable difference corresponds to a smallest change in a motor position setting that results in an perceivable change in a focus level of the monitoring device; and select a temperature adjusted motor position setting for the focus motor based on a result of the just noticeable difference modification.

According to yet another aspect, a controller device may include logic configured to detect a temperature change, greater than a temperature change threshold, from a previous temperature to a current temperature; retrieve a trend-based motor position setting for a focus motor from a memory based on the current temperature; select a starting motor position sating for the focus motor based on the retrieved trend-based motor position setting or a current motor position setting; perform a modification on the focus motor using the selected starting motor position setting; and select a temperature adjusted motor position setting for the focus motor based on a result of the modification.

DETAILED DESCRIPTION OF PREFERRED EMBODIMENTS

Figure 1:
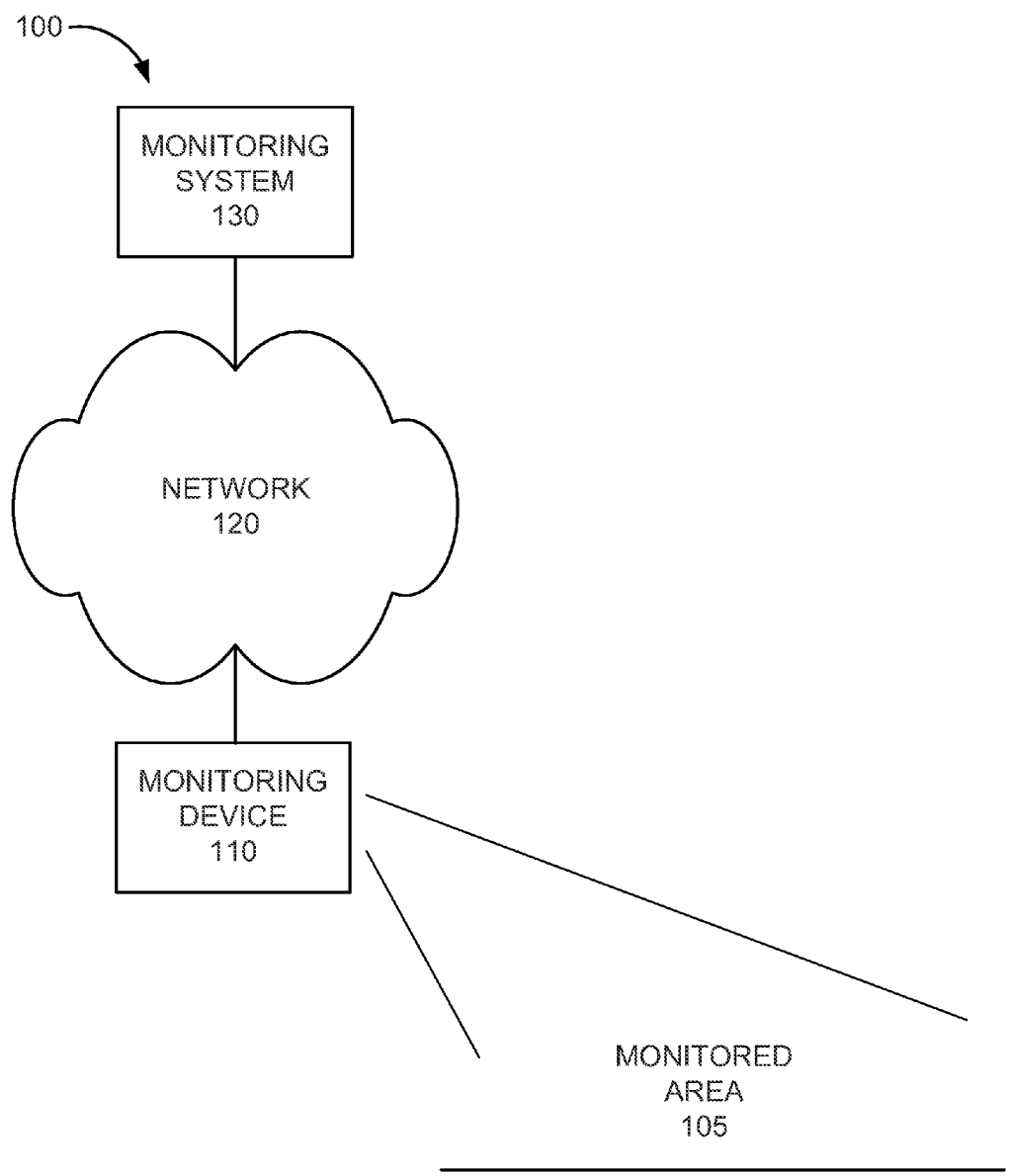
FIG. 1 is a diagram illustrating an exemplary environment according to an implementation described herein.

The following detailed description refers to the accompanying drawings. The same reference numbers in different drawings identify the same or similar elements.

An implementation described herein relates to compensating for changes in the focal plane of a monitoring device caused by temperatures changes to the monitoring device. The back focus of the monitoring device may change when a change in temperature causes part of the optics chain to expand or contract, thereby changing the distance between a focus lens and a sensor area. A table of focus motor settings may be maintained for different temperatures. In some implementations, the focus motor may be configured to move the focus lens. In other implementations, the focus motor may be configured to move the sensor area. Thus, "focus motor," as the phrase is used herein, may refer to either a motor used to move a focus lens of a monitoring device, or a motor used to move a sensor area of the monitoring device. When a temperature change, greater than a temperature threshold, is detected from a previous temperature to a current temperature, a focus compensation may be activated. An average of the previous focus motor position settings associated with the current temperature may be determined from the table of focus motor settings and compared to the current focus motor setting. The average of the previous focus motor position settings may represent a trend of the focus motor settings for the temperature over time and may thus be referred to as a trend-based focus motor position setting.

If no entries exist for the current temperature in the table, or if the retrieved trend-based focus motor position setting corresponds to the current focus motor position setting, the current focus motor position setting may be selected as the starting focus motor position setting for performing a temperature compensation adjustment. If the retrieved trend-based focus motor position setting differs from the current focus motor position setting, focus values for both the trend-based focus motor position setting and the current focus motor position setting may be determined and the setting with the higher focus value may be selected as the starting focus motor position setting for performing a temperature compensation adjustment.

The temperature compensation adjustment may be performed using a just noticeable difference (JND) "walk" from the selected starting focus motor position setting. A JND may correspond to the smallest detectable difference, by a person, in focus for captured images. In other words, a JND may correspond to a small change in focus that may be noticed by an average person without the change significantly affecting the person's perception of an image. A number of steps for a motor, corresponding to a JND, may be configured for a particular monitoring device based on a characterization of the particular monitoring device during manufacture and/or during installation.

A JND walk, also referred to herein as a JND modification, may be performed by determining a first focus value for a first setting corresponding to the selected starting focus motor position setting. The focus motor position setting may be moved up by a JND value to a second setting and a focus value may be determined for each motor step while moving the motor from the starting position to the second setting. The focus motor position setting may then be returned to the starting position and moved down by a JND value from the starting setting to a third setting and a focus value may be determined for each motor step while moving the motor from the starting position to the third setting. The setting associated with the highest focus value may be selected as the temperature adjusted focus motor position setting and the table may be updated based on the selected setting.

FIG. 1 is a diagram of an exemplary environment 100 in which the systems and/or methods described herein may be implemented. As shown in FIG. 1, environment 100 may include a monitored area 105, a monitoring, device 110, a network 120, and a monitoring system 130. Monitored area 105 may include an area monitored by monitoring device 110. For example, if monitoring device 110 is installed above an entrance to a building, monitored area 105 may include the area in front of the entrance to the building. As another example, if monitored device 110 is installed in a hallway, monitored area 105 may include the hallway.

Monitoring device 110 may include one or more devices for capturing images of monitored area 105. Monitoring device 110 may include, for example, a video camera that may capture image data using visible light, using infrared light, and/or using other non-visible electromagnetic radiation. The captured image data may include a continuous video sequence, a limited video sequence that does not include a continuous sequence of images, still images, and/or a combination thereof. Monitoring device 110 may include a digital camera for capturing digital images and/or an analog camera for capturing analog images. Monitoring device 110 may perform a trend-based temperature compensation in order to maintain a stable focal plane, as described below.

Network 120 may enable monitoring device 110 to communicate with monitoring system 130. Network 120 may include one or more wired and/or wireless networks. For example, network 120 may include a cellular network, the Public Land Mobile Network (PLMN), a second generation (2G) network, a third generation (3G) network, a fourth generation (4G) network (e.g., a long term evolution (LTE) network), a fifth generation (5G) network, a code division multiple access (CDMA) network, a global system for mobile communications (GSM) network, a general packet radio services (GPRS) network, a combination of the above networks, and/or another type of wireless network. Additionally, or alternatively, network 120 may include a local area network (LAN), a wide area network (WAN), a metropolitan area network (MAN), an ad hoc network, an intranet, the Internet, a fiber optic-based network (e.g., a fiber optic service network), a satellite network, a television network, and/or a combination of these or other types of networks.

Monitoring system 130 may include one or more devices, such as computer devices, for receiving image data from monitoring device 110. For example, monitoring system 130 may include one or more display devices for displaying image data captured by monitoring device 110 and/or may include one or more storage devices for storing the captured image data. Furthermore, monitoring system 130 may include one or more devices for controlling and/or configuring monitoring device 110. For example, monitoring system 130 may control a motor that may move monitoring device 110 to point in a different direction. Moreover, while implementations described herein include a trend-based temperature compensation being performed by monitoring device 110, in other implementations, some or all of the trend-based temperature compensation may be performed by monitoring system 130.

Although FIG. 1 shows exemplary components of environment 100, in other implementations, environment 100 may include fewer components, different components, differently arranged components, or additional components than depicted in FIG. 1. Additionally or alternatively, one or more components of environment 100 may perform functions described as being performed by one or more other components of environment 100.

Figure 2A:
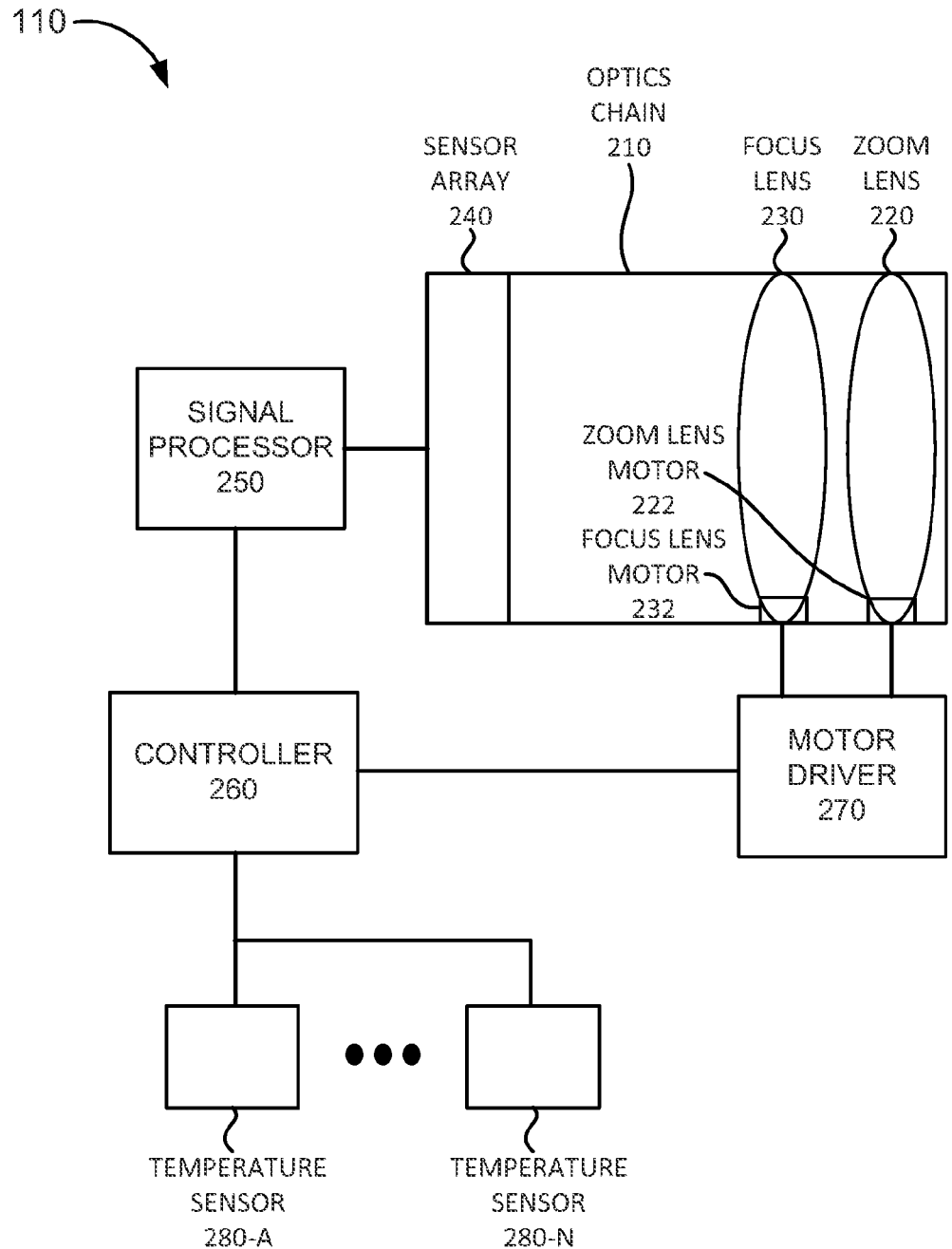
FIG. 2A is a diagram illustrating exemplary components of a first exemplary monitoring device of FIG. 1.

FIG. 2A is a diagram illustrating example components of a first exemplary monitoring device 110 according to an implementation described herein. As shown in FIG. 2A, monitoring device 110 may include an optics chain 210, a signal processor 250, a controller 260, a motor driver 270, and one or more temperature sensors 280-A to 280-N (referred to herein collectively as "temperature sensors 280" and individually as "temperature sensor 280").

Optics chain 210 may include an enclosure that directs incident light to a sensor area that includes sensors to capture an image based on the incident light. Optics chain 210 may change in dimension in response to a change in temperature, or in response to other changes in the environment, such as, for example, a change in humidity or as a result of mechanical vibration. Optics chain 210 may include a zoom lens 220, a focus lens 230, and a sensor array 240.

Zoom lens 220 may collect and focus incident light from monitored area 105 and may be adjusted to focus on a particular object or aspect of monitored area 105. Zoom lens 220 may include a zoom lens motor 222. Focus lens 230 may further collect and focus the incident light from monitored area 105 and may focus the light onto sensor array 240. Focus lens 230 may be adjusted using motor driver 270 to compensate for changes to optics chain 210 caused by changes in temperature. Focus lens 230 may include a focus lens motor 232.

Sensor array 240 may include an array of sensors for registering incident light in the visible light wavelength range and/or in the infrared light wavelength range. Sensor array 240 may include, for example, a charged coupled device (CCD) array and/or an active pixel array (e.g., a complementary metal-oxide-semiconductor (CMOS) sensor array).

Signal processor 250 may perform one or more signal processing operations on images captured by sensor array 240. For example, signal processor 250 may determine a focus value for a captured image, or may perform part of the processing required to determine a focus value for a captured image (e.g., by applying an edge detection process to the captured image). The focus value may be determined by applying a particular focus algorithm to the captured image.

Controller 260 may control operation and/or configuration of monitoring device 110. Among other things, controller 260 may adjust focus lens 230 to compensate for changes to optics chain 210 caused by changes in temperatures, based on information obtained from signal processor 250 and/or information obtained from temperature sensors 280. Operation of controller 260 is described below in greater detail with reference to FIG. 4. Motor driver 270 may drive focus lens motor 232 (and/or zoom lens motor 222) to change the focus. Motor driver 270 may adjust focus lens 230 in discrete steps using focus lens motor 232, thereby changing the distance between focus lens 230 and sensor array 240, in order to adjust the back focus of monitoring device 110.

Temperature sensor 280 may include a temperature sensor located on the inside or outside of monitoring device 110. As an example, a single temperature sensor 280 may be mounted onto an enclosure of optics chain 210. As another example, a single temperature sensor 280 may be located within, or adjacent to, controller 260. As yet another example, multiple temperature sensors 280 may be mounted along the length of optics chain 210. As yet another example, a first temperature sensor 280 may be mounted onto an enclosure of optics chain 210 and a second temperature sensor 280 may be mounted in a different location, within monitoring device 110, remote from optics chain 210. Temperature sensor 280 may include a thermocouple, a resistance thermometer, a thermistor, a semiconductor bandgap temperature sensor, and/or another type of thermometer device.

Figure 2B:
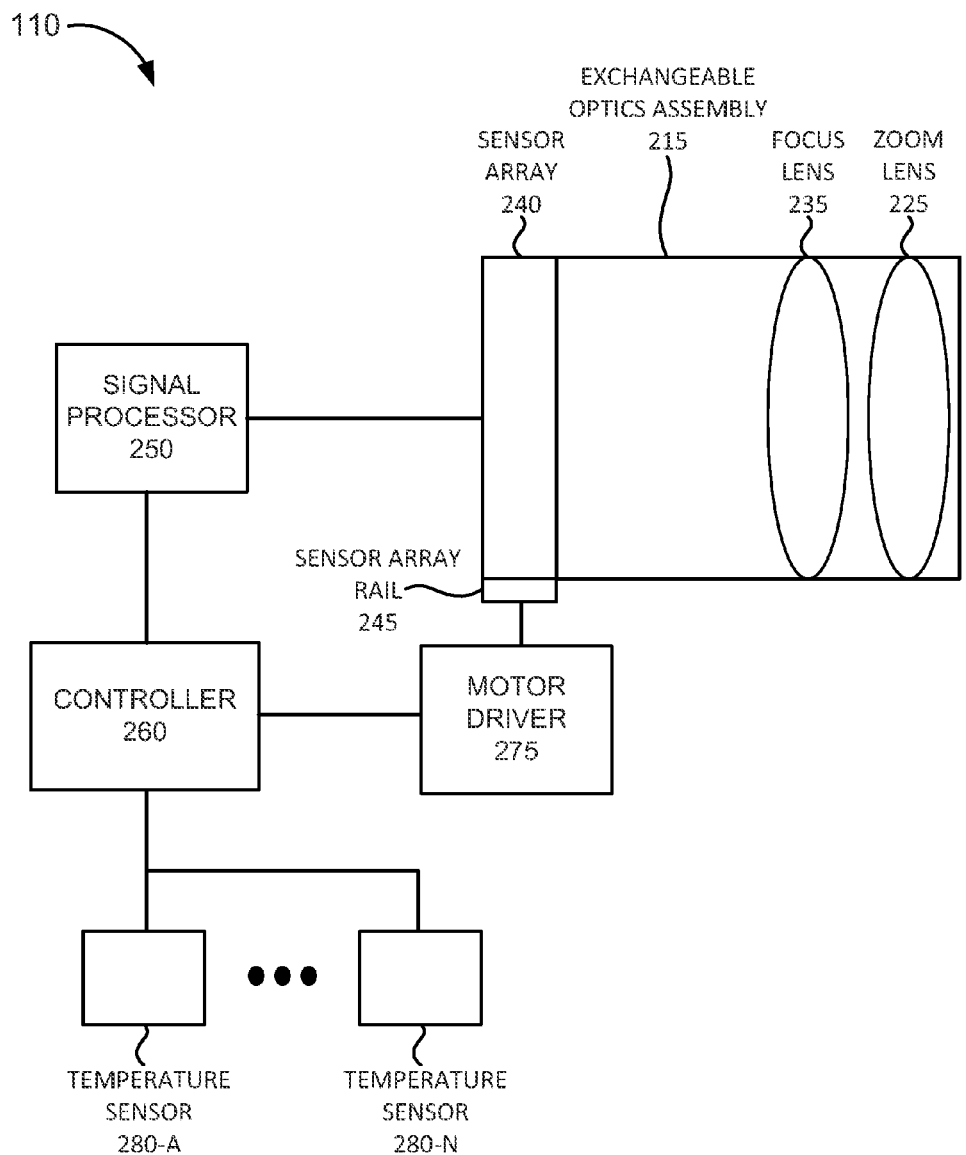
FIG. 2B is a diagram illustrating exemplary components of a second exemplary monitoring device of FIG. 1.

FIG. 2B is a diagram illustrating example components of a second exemplary monitoring device 110 according to an implementation described herein. As shown in FIG. 2B, monitoring device 110 may include an exchangeable optics assembly 215, signal processor 250, controller 260, a motor driver 275, and one or more temperature sensors 280.

Exchangeable optics assembly 215 may be removable from monitoring device 110. Exchangeable optics assembly 215 may include a zoom lens 225 and a focus lens 235. Zoom lens 225 may function as described above with reference to zoom lens 220. Focus lens 235 may function as described above with reference to focus lens 230, except that focus lens 235 may not be adjustable using controller 260. Rather, in the monitoring device 110 of FIG. 2B, the back focus may be adjusted by moving sensor array 240.

Sensor array 240 may be adjustable via a sensor array rail 245. Sensor array rail 245 may move sensor array 240 in a direction away from focus lens 235 or in a direction toward focus lens 235 in order to change the distance between focus lens 235 and sensor array 240 and to thereby change the back focus of monitoring device 110. Sensor array rail 245 may be controlled via motor driver 275. Thus motor driver 275 may be used by controller 260 to adjust sensor array 240 via sensor array rail 245.

Although FIGS. 2A and 2B show exemplary components of monitoring device 110, in other implementations, monitoring device 110 may include fewer components, different components, differently arranged components, or additional components than depicted in FIG. 2A or 2B. Additionally or alternatively, one or more components of monitoring device 110 may perform functions described as being performed by one or more other components of monitoring device 110.

Figure 3:
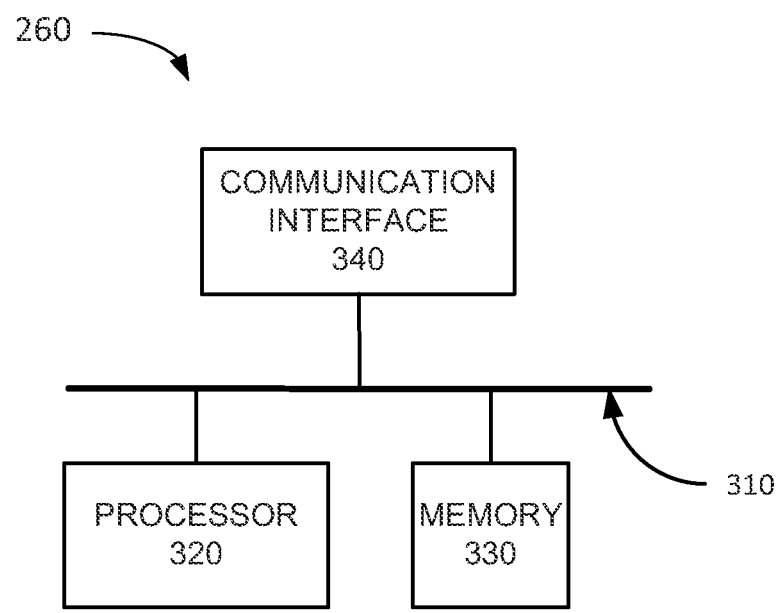
FIG. 3 is a diagram illustrating exemplary components of the controller of FIGS. 2A and 2B.

FIG. 3 is a diagram illustrating example components of controller 260 according to an implementation described herein. As shown in FIG. 3, controller 260 may include a bus 310, a processor 320, a memory 330, and a communication interface 340. Bus 310 may include a path that permits communication among the components of controller 260. Processor 320 may include any type of single-core processor, multi-core processor, microprocessor, latch-based processor, and/or processing logic (or families of processors, microprocessors, and/or processing logics) that interprets and executes instructions. In other embodiments, processor 320 may include an application-specific integrated circuit (ASIC), field-programmable gate array (FPGA), and/or another type of integrated circuit or processing logic.

Memory 330 may include any type of dynamic storage device that may store information and/or instructions, for execution by processor 320, and/or any type of non-volatile storage device that may store information for use by processor 320. For example, memory 330 may include a random access memory (RAM) or another type of dynamic storage device, a read-only memory (ROM) device or another type of static storage device, a content addressable memory (CAM), a magnetic and/or optical recording memory device and its corresponding drive a hard disk drive, optical drive, etc.), and/or a removable form of memory, such as a flash memory.

Communication interface 340 may include a transceiver that enables controller 260 to communicate with other devices and/or systems via wireless communications (e.g., radio frequency, infrared, and/or visual optics, etc., wired communications (e.g., conductive wire, twisted pair cable, coaxial cable, transmission line, fiber optic cable, and/or waveguide, etc.), or a combination of wireless and wired communications. Communication interface 340 may include a transmitter that converts baseband signals to radio frequency (RF) signals and/or a receiver that converts RF signals to baseband signals. Communication interface 340 may be coupled to an antenna for transmitting and receiving RF signals.

Communication interface 340 may include a logical component that includes input and/or output ports, input and/or output systems, and/or other input and output components that facilitate the transmission of data to other devices. For example, communication interface 340 may include a network interface card (e.g., Ethernet card) for wired communications and/or a wireless network interface (e.g., a WiFi) card for wireless communications. Communication interface 340 may also include a universal serial bus (USB) port for communications over a cable, a Bluetooth™ wireless interface, a radio-frequency identification (RFID) interface, a near-field communications (NFC) wireless interface, and/or any other type of interface that converts data from one form to another form.

As will be described in detail below, controller 260 may perform certain operations relating to trend-based temperature compensation of a motor setting for a focus lens for a monitoring device. Controller 260 may perform these operations in response to processor 320 executing software instructions contained in a computer-readable medium, such as memory 330. A computer-readable medium may be defined as a non-transitory memory device. A memory device may be implemented within a single physical memory device or spread across multiple physical memory devices. The software instructions may be read into memory 330 from another computer-readable medium or from another device. The software instructions contained in memory 330 may cause processor 320 to perform processes described herein. Alternatively, hardwired circuitry may be used in place of, or in combination with, software instructions to implement processes described herein. Thus, implementations described herein are not limited to any specific combination of hardware circuitry and software.

Although FIG. 3 shows exemplary components of controller 260, in other implementations, controller 260 may include fewer components, different components, additional components, or differently arranged components than depicted in FIG. 3. Additionally or alternatively, one or more components of controller 260 may perform one or more tasks described as being performed by one or more other components of controller 260.

Figures 4, 5:
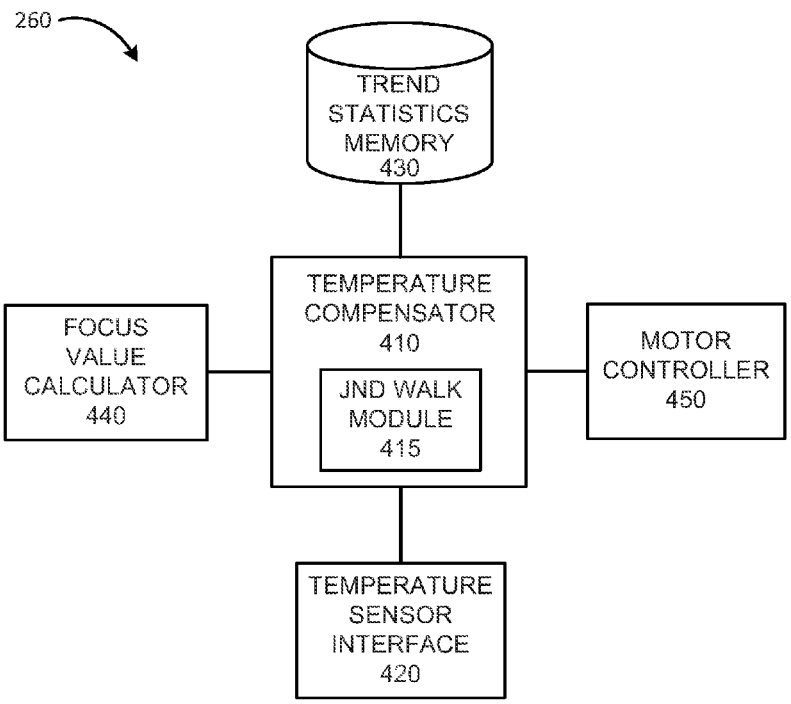
FIG. 4 is a diagram illustrating exemplary functional components of the controller of FIGS. 2A and 2B.
FIG. 5 is a diagram of exemplary components that may be stored in the trend statistics memory of FIG. 4.

FIG. 4 is a diagram illustrating exemplary functional components of controller 260. The functional components of controller 260 may be implemented, for example, via processor 320 executing instructions from memory 330. Alternatively, some or all of the functional components of controller 260 ma be hardwired. As shown in FIG. 4, controller 260 may include a temperature compensator 410, a temperature sensor interface 420, a trend statistics memory 430, a focus value calculator 440, and a motor controller 450.

Temperature compensator 410 may perform a temperature compensation process by adjusting focus lens 230 in response to a detected temperature change based on information stored in trend statistics memory 430. Temperature compensator 410 may include a JND walk module 415. JND walk module 415 may perform a JND walk on focus lens 230 using motor driver 270. For example, JND walk module 415 may record a first focus value for a selected starting setting for motor driver 270, may instruct motor driver 270 to adjust focus lens 230 up by a JND step size from the selected starting setting, may record a second focus value for the second adjusted setting, may instruct motor driver 270 to adjust focus lens 230 down by a JND step size from the selected starting setting, and may record a third focus value for the third adjusted setting. JND walk module 415 may determine the setting associated with the highest focus value.

Temperature sensor interface 420 may obtain temperature readings from temperature sensors 280 at particular intervals. Trend statistics memory 430 may store trend statistics corresponding to motor settings for particular temperature values. Exemplary information that may be stored in trend statistics memory 430 is described below with reference to FIG. 5.

Focus value calculator 440 may determine a focus value for a captured image associated with a particular focus motor position setting. In some implementations, focus value calculator 440 may obtain the focus value from signal processor 250. In other implementations, focus value calculator 440 may calculate the focus value based on information obtained from signal processor 250. In some implementations, the focus value may correspond to a Sobel value determined by applying a Sobel operator to a captured image. In other implementations, the focus value may be determined using a different technique, such as, for example, by using a different type of operator (e.g., a Frei operator, a Chen operator, a Prewitt operator, etc.), by using a gradient-based technique, by using a statistics-based technique, and/or by using another type of technique. When monitoring device 110 is installed, a particular area of a captured image may be selected as a focus area and the focus value may be computed for the selected area of an image. For example, if monitoring device 110 is focused on a particular object in monitored area 105, the focus value may be computed for the area of the image in which the particular object is located.

When monitoring device 110 is installed, the person installing monitoring device 110 may select an area for which a focus value should be calculated. In one example, a user may define a rectangular area, or another polygonal shape, by specifying a set of vertices in a captured image. In another example, the area may be selected by using a pointing device (e.g., mouse, stylus, etc.) to draw a shape in a captured image.

In yet another example, an edge detection technique may be used to detect shapes in an image that correspond to object in monitored area 105 and the person may select one of the detected shapes as the area for which the focus value should be computed.

Motor controller 450 may enable communication with motor driver 270. For example, motor controller 450 may instruct motor driver 270 to adjust focus lens 230 to a particular selected motor position setting.

Although FIG. 4 shows exemplary functional components of controller 260, in other implementations, controller 260 may include fewer functional components, different functional components, differently arranged functional components, or additional functional components than depicted in FIG. 4. Additionally or alternatively, one or more functional components of controller 260 may perform functions described as being performed by one or more other functional components of controller 260.

FIG. 5 is a diagram of exemplary components that may be stored in trend statistics memory 430. Trend statistics memory 430 may include a last adjustment temperature field 502, a current temperature field 504, a temperature difference threshold 506, a current motor setting field 508, a JND walk steps field 510, and a trend table 512.

Last adjustment temperature 502 may store the temperature at which the last adjustment to focus lens 230 was performed. Current temperature field 504 may store the current temperature received from temperature sensors 280. In one implementation, a particular temperature sensor 280 may be used to determine the current temperature. For example, a temperature sensor 280 that is located closest to sensor array 240 may be used to determine the current temperature. In another implementation, multiple temperature sensors 280 may be used to determine the current temperature. For example, multiple temperature sensors 280 may be located along optics chain 210 and an average of the temperatures measured by the multiple temperature sensors 280 may be recorded as the current temperature. The current temperature may be updated at particular intervals.

Temperature difference threshold field 506 may store a temperature difference threshold that, if reached or exceeded, may trigger controller 260 to perform a temperature adjustment to focus lens 230. Thus, if the current temperature differs from the last adjustment temperature by at least the temperature difference threshold, the temperature adjustment process may be triggered. In one implementation, the temperature difference threshold may be set to three degrees centigrade. In another implementation, the temperature difference threshold may be set to a different value (e.g., less than three degrees centigrade, such as one degree centigrade, or more than three degrees centigrade, such as four degrees centigrade).

Current motor setting field 508 may store a current motor setting for focus lens 230. JND walk steps field 510 may store a number of motor steps to move a motor when performing a JND walk and may correspond to the number of steps the focus motor may be moved to results in a just noticeable difference in focus. As an example, motor driver 270 may include 256 possible settings and the JND walk steps may be set to a step size of 3 motor settings. The JND step size may be determined for a particular monitoring device 110 experimentally. For example, focus lens 230 of monitoring device 110 may be adjusted with motor driver 270 by incrementing the setting of motor driver 270 in single steps until a change in focus is just noticeable.

Trend table 512 may store settings for motor driver 270 for each particular temperature. For example, trend table 512 may include temperature value entries 520-A to 520-N, where temperature value entry 520-A corresponds to the lowest probable temperature, which may be experienced by monitoring device 110, and where temperature value entry 520-N corresponds to the highest probable temperature, which may be experienced by monitoring device 110. As an example, the temperature range may be from −20 degrees centigrade to 70 degrees centigrade. Each temperature value entry 520-X may be associated with one or more motor position entries 530-X-A to 530-X-M, where each of the motor position entries 530-X corresponds to a focus motor position setting that has been previously selected by controller 260 for the temperature value stored in temperature value entry 520-X. Each temperature value entry 520-X may further be associated with a motor position average entry 535-X, which may be an average of motor position entries 530-X-A to 530-X-M. The value stored in motor position average entry 535-X may be used as the trend-based motor position setting for the temperature value stored in temperature value entry 520-X. If there are no motor position entries associated with temperature value entry 520-X, motor position average entry 535-X may store the value "none" or provide another indication that no data is stored for that temperature value.

In one implementation, M may correspond to five and trend table 512 may include up to five entries for previous motor position settings associated with a particular temperature. When five entries are present for a particular temperature and another entry is added, the oldest entry may be removed. In another implementation, entries up to a different number may be stored. In some implementations, trend table 512 may initially not include any motor position entries for each temperature and the values in trend table 512 may be built up over time as monitoring device 110 is in use. In other implementations, trend table 512 may be initially filled with a default value for each temperature value entry 520.

Although FIG. 5 shows exemplary components of trend statistics memory 430, in other implementations, trend statistics memory 430 may include fewer components, different components, differently arranged components, or additional components than depicted in FIG. 5.

Figure 6A:
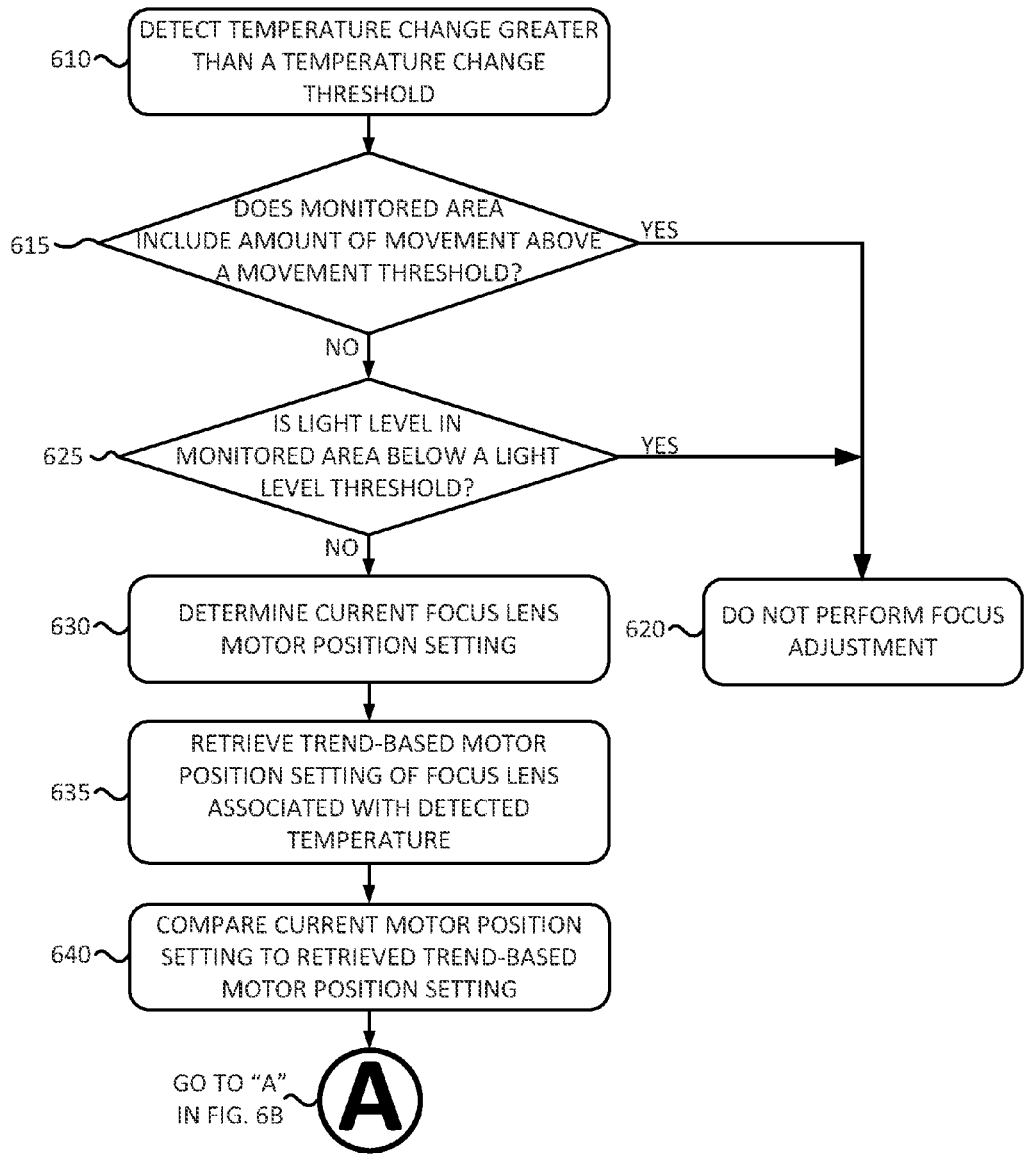
FIGS. 6A-6B are flow charts of an exemplary process for trend-based temperature compensation according to an implementation described herein.
Figure 6B:
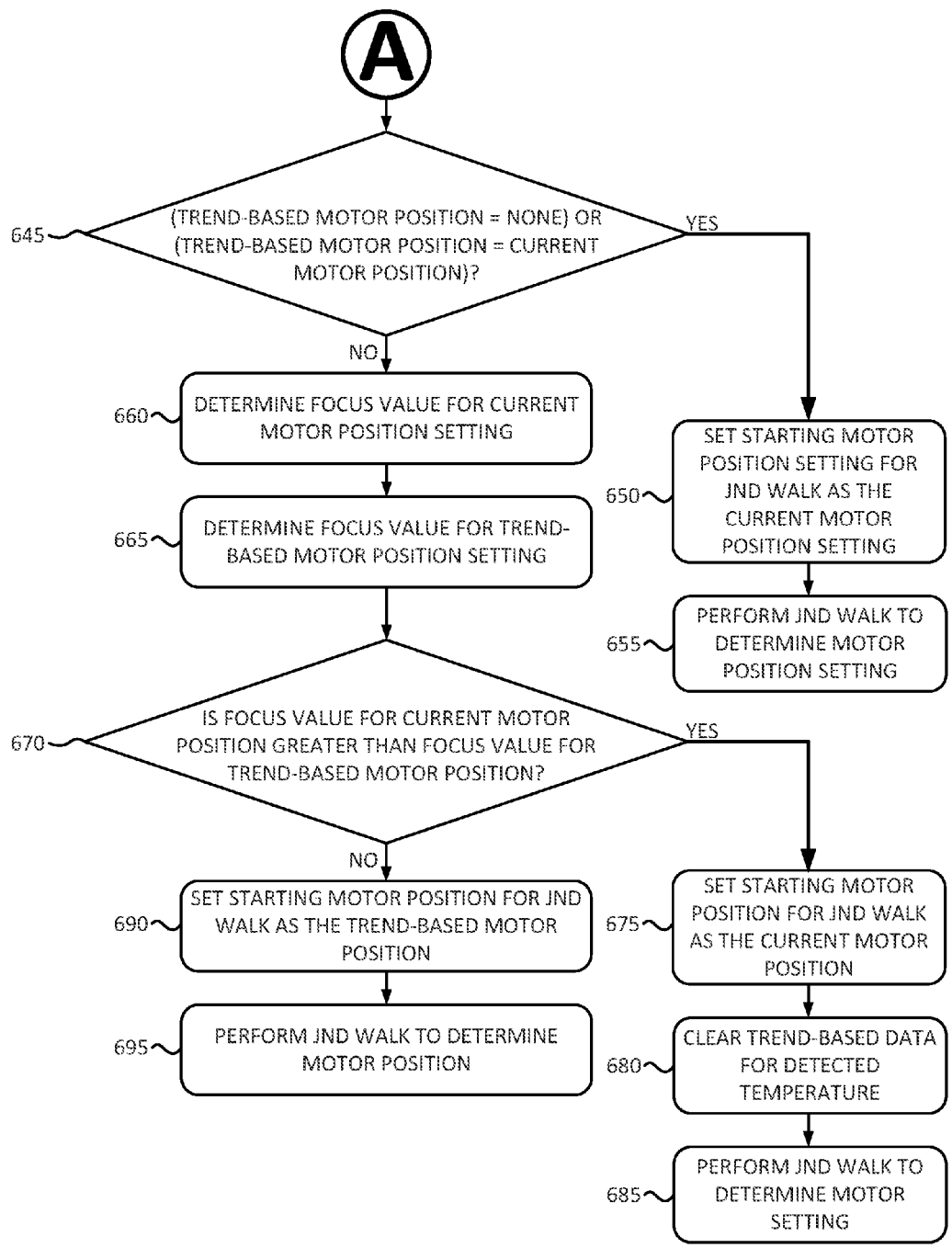

FIGS. 6A and 6B are flow charts of an exemplary process for trend-based temperature compensation of a focus lens according to an implementation described herein. In one implementation, the process of FIGS. 6A and 6B may be performed by controller 260. In other implementations, some or all of the process of FIGS. 6A and 6B may be performed by another device or a group of devices separate from controller 260 and/or including controller 260. For example, some or all of the process of FIGS. 6A and 6B may be performed by monitoring system 130.

The process of FIG. 6A may include detecting a temperature change greater than a temperature threshold (block 610). For example, temperature compensator 410 may determine whether the current temperature, stored in current temperature field 504, exceeds the temperature stored in last adjustment temperature field 502 by at least the amount stored in temperature difference threshold field 506. A determination may be made as to whether the monitored area 105 includes an amount of movement greater than a movement threshold (block 615). For example, signal processor 250 may compare multiple images captured in sequence to determine whether a significant amount of movement exists in monitored area 105, or in apart of monitored area 105 corresponding to an area of a captured image for which the focus value is calculated. If it is determined that the monitored area includes an amount of movement greater than a threshold (block 615—YES), focus adjustment may not be performed (block 620). For example, if a significant amount of movement exists in monitored area 105, focus values obtained for a captured image may not be accurate and, therefore, temperature adjustment to focus lens 230 may not be performed. In some implementations, the process of FIGS. 6A and 68 may not continue until another temperature change greater than the temperature difference threshold is detected. In other implementations, the process of FIGS. 6A and 6B may be paused for a particular length of time, after which another determination may be made about the level of movement in monitored area 105. If the level of movement has decreased to below the movement threshold, the process of FIGS. 6A and 613 may resume.

If it is determined that the monitored area does not include an amount of movement greater than a threshold (block 615—NO), processing may continue to determine whether the light level in the monitored area is below a light level threshold (block 625). For example, signal processor 250 may calculate a light level of a captured image and controller 260 may determine whether the light level is below a light level threshold. If it is determined that the light level in the monitored area is below a light level threshold (block 615—YES), focus adjustment may not be performed (block 620). For example, a low light level in monitored area 105 may result in inaccurate focus values for captured images and thus temperature adjustment to focus lens 230 may not be performed.

If it is determined that the light level in the monitored area is not below a light level threshold (block 615—NO), processing may continue to determine a current focus motor position setting (block 630) and to retrieve a trend-based motor position of the focus lens associated with the detected temperature (block 635). For example, temperature compensator 410 may retrieve the current focus motor position setting from current motor setting field 508. Furthermore, temperature compensator 410 may retrieve the trend-based motor position setting by accessing motor position average entry 535 associated with the temperature value stored in current temperature field 504. The current motor position may be compared to the retrieved trend-based motor position (block 640). For example, temperature compensator 410 may determine whether the current motor position setting differs from the retrieved trend-based motor position setting.

Continuing to FIG. 6B, a determination may be made as to whether the trend-based motor position setting corresponds to a value of "none" or whether the trend-based motor position setting corresponds to the current motor position setting (block 645). For example, if there are no entries in trend table 512 for the current temperature, or if the retrieved trend-based motor position setting is the same as the current motor position setting (block 645—YES), the current motor position setting may be used as the starting point for the temperature adjustment to focus lens 230. Thus, the current motor position setting may be set as the starting motor position setting (block 650) and a JND walk may be performed to determine the adjusted motor position setting (block 655). A process for performing a JND walk is described below with reference to FIG. 7.

If the retrieved trend-based motor position setting differs from the current motor position setting (block 645), a focus value for the current motor position setting may be determined (block 660), a focus value for the retrieved trend-based motor position setting may be determined (block 665), and determination may be made as to whether the focus value for the current motor position setting is greater than the focus value for the retrieved trend-based motor position setting (block 670). For example, focus value calculator 440 may determine a Sobel value for an area, designated as a focus area, of an image captured using the current motor position.

Motor controller 450 may then instruct motor driver 270 to set focus lens 230 to the retrieved trend-based motor position and focus value calculator 440 may then determine a Sobel value for the focus area of an image captured using the trend-based motor position.

If it is determined that the focus value for the current motor position setting is greater than the retrieved trend-based motor position setting (block 670—YES), the current motor position setting may be set as the starting motor position setting (block 675), trend-based data for the current temperature may be cleared (block 680) and a JND walk may be performed to determine the adjusted motor position setting (block 685). If the current motor position is better than the retrieved trend-based position, based on the higher focus value associated with the current motor position, the current motor position may be selected as the starting point for the temperature adjustment to focus lens 230. Furthermore, since the trend-based motor position setting is not better than the current motor position setting, in this case, the data stored in trend table 512 may be cleared. The JND walk may then be performed as described below with reference to FIG. 7.

If it is determined that the focus value for the current motor position setting is not greater than the retrieved trend-based motor position setting (block 670—NO), the retrieved trend-based motor position setting may be set as the starting motor position setting (block 690) and a JND walk may be performed to determine the adjusted motor position setting (block 695). If the retrieved trend-based motor position is better than the current motor position, based on the higher focus value associated with the retrieved trend-based motor position, the retrieved trend-based motor position may be selected as the starting point for the temperature adjustment to focus lens 230. The JND walk may then be performed as described below with reference to FIG. 7.

Figure 7:
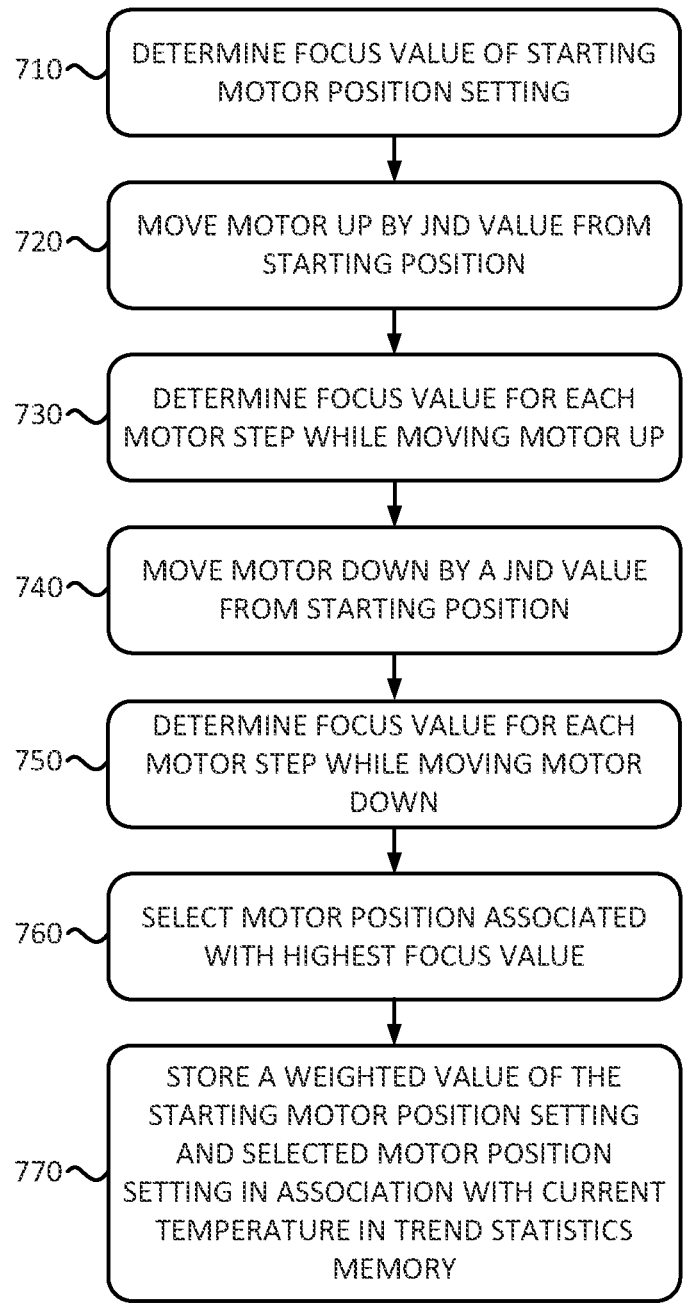
FIG. 7 is a flow chart of an exemplary process for performing a just noticeable difference walk according to an implementation described herein.

FIG. 7 is a flow chart of an exemplary process for performing a JND walk according to an implementation described herein. In one implementation, the process of FIG. 7 may be performed by controller 260. In other implementations, some or all of the process of FIG. 7 may be performed by another device or a group of devices separate from controller 260 and/or including controller 260. For example, some or all of the process of FIG. 7 may be performed by monitoring system 130.

The process of FIG. 7 may include determining a focus value for a starting motor position setting (block 710). For example, focus value calculator 440 may determine a focus value associated with the selected starting motor position setting. The selected starting motor position setting may correspond to either the current motor position setting or the retrieved trend-based motor position setting, as determined by the process of FIGS. 6A-B described above. For example, if the starting motor position corresponds to a setting of S, focus value calculator 440 may determine a focus value for the setting of S.

The motor may be moved up or adjusted by a JND value from the starting motor position setting (block 720) and a focus value may be determined for each motor step while moving the motor up (block 730). JND walk module 415 may determine the JND walk steps from JND walk steps field 510 and may instruct motor controller 450 to move the focus motor up by a number of steps corresponding to the JND walk step size, in order to change to focal length of focus lens 230 in a first direction. For example, if the starting motor position setting corresponds to a motor position setting of S and if the JND walk step size corresponds to three motor setting steps, JND walk module 415 may instruct motor controller 450 to move the focus motor to a setting of S+1 and focus value calculator 440 may determine a focus value for the setting of S+1. JND walk module 415 may then instruct motor controller 450 to move the focus motor to a setting of S+2 and focus value calculator 440 may determine a focus value for the setting of S+2. JND walk module 415 may instruct motor controller 450 to move the focus motor to a setting of S+3 and focus value calculator 440 may determine a focus value for the setting of S+3.

The motor may be moved down by a JND value from the starting motor position setting (block 740) and a focus value may be determined for each motor step while moving the motor down (block 750). JND walk module 415 instruct motor controller 450 to move the focus motor down from the starting position by a number of steps corresponding to the JND walk step size, in order to change to focal length of focus lens 230 in a second direction. For example, the motor may be moved back to the starting position of S, JND walk module 415 may instruct motor controller 450 to move the focus motor to a setting of S−1, and focus value calculator 440 may determine a focus value for the setting of S−1. JND walk module 415 may then instruct motor controller 450 to move the focus motor to a setting of S−2 and focus value calculator 440 may determine a focus value for the setting of S−2. Finally, JND walk module 415 may instruct motor controller 450 to move the focus motor to a setting of S−3 and focus value calculator 440 may determine a focus value for the setting of S−3.

The motor position associated with the highest focus value may be selected (block 760). For example, temperature compensator 410 may select a temperature adjusted motor position from the set of motor positions {S−3, S−2, S−1, S, S+1, S+2, S+3} associated with the highest Sobel value (or another type of focus value measurement) and may instruct motor controller 450 to move the focus motor to the selected temperature adjusted motor position.

A weighted value of the starting motor position setting and the selected motor position setting may be stored in association with the current temperature in the trend statistics memory (block 770). A weighted value may be selected to give a particular weight to the selected starting position and a particular weight to the selected temperature adjusted position. In some implementations, the selected starting position may be given a weight of 50% and the selected temperature adjusted position may be given a weight of 50%. Thus, for example, if the temperature adjusted position was selected as the position S+2, the saved value would correspond to 0.5*S+ 0.5*(S+2). If the current temperature corresponds to the value stored in temperature value field 520-X, and if the corresponding motor position settings include entries for motor position entries 530-X-A, 530A-B, 540-X-C, 530-X-D, and 530A-E, the value in 530-X-A may be discarded, the other values may be shifted down, and the new value of 0.5*S+0.5* (S+2) may be stored in motor position entry 530-X-E. In other words, the oldest entry in the trend data may be discarded. Furthermore, the value in motor position average field 535-X may be updated.

In the preceding specification, various preferred embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

For example, while series of blocks have been described with respect to FIGS. 6A-6B and 7, the order of the blocks may be modified in other implementations. Further, non-dependent blocks may be performed in parallel.

Furthermore, white focus compensation has been described herein with respect to a detected change in temperature, in other implementation, focus compensation may be performed with respect to another detected change. As an example, monitoring device 110 may include a humidity sensor and focus compensation may be performed in response to a detected change in the humidity level. As another example, monitoring device 110 may include a vibration sensor and focus compensation may be performed in response to a detected vibration or a vibration greater than a vibration threshold.

It will be apparent that systems and/or methods, as described above, may be implemented in many different forms of software, firmware, and hardware in the implementations illustrated in the figures. The actual software code or specialized control hardware used to implement these systems and methods is not limiting of the embodiments. Thus, the operation and behavior of the systems and methods were described without reference to the specific software code—it being understood that software and control hardware can be designed to implement the systems and methods based on the description herein.

Further, certain portions, described above, may be implemented as a component that performs one or more functions. A component, as used herein, may include hardware, such as a processor, an ASIC, or a FPGA, or a combination of hardware and software (e.g., a processor executing software).

It should be emphasized that the terms "comprises"/"comprising" when used in this specification are taken to specify the presence of stated features, integers, steps or components but does not preclude the presence or addition of one or more other features, integers, steps, components or groups thereof.

No element, act, or instruction used in the present application should be construed as critical or essential to the embodiments unless explicitly described as such. Also, as used herein, the article "a" is intended to include one or more items. Further, the phrase "based on" is intended to mean "based, at least in part, on" unless explicitly stated otherwise.

What is claimed is:

1. A method, performed by a monitoring device, comprising:
    detecting, by the monitoring device, a temperature change, greater than a temperature change threshold, from a previous temperature to a current temperature;
    retrieving, by the monitoring device, a trend-based motor position setting for a focus motor from a trend statistics memory based on the current temperature;
    selecting, by the monitoring device, a starting motor position setting for the focus motor based on the retrieved trend-based motor position setting or a current motor position setting;
    performing, by the monitoring device, a just noticeable difference modification on the focus motor from the selected starting motor position setting, wherein the just noticeable difference corresponds to a smallest number of steps in a motor position setting that results in a perceivable change in a focus level of images captured by the monitoring device; and
    selecting, by the monitoring device, a temperature adjusted motor position setting for the focus motor based on a result of the just noticeable difference modification.

2. The method of claim 1, wherein detecting the temperature change, greater than a temperature change threshold, from a previous temperature to a current temperature, includes:
    obtaining temperature readings from a plurality of temperature sensors associated with the monitoring device; and
    averaging the obtained temperature readings to determine the current temperature.

3. The method of claim 1, further comprising:
    determining whether an area monitored by the monitoring device includes an amount of movement greater than a movement threshold; and
    selecting not to perform the retrieving a trend-based motor position setting, the selecting a starting motor position setting, the performing a just noticeable difference modification, and the selecting a temperature adjusted motor position setting, when the area monitored by the monitoring device includes an amount of movement greater than the movement threshold.

4. The method of claim 1, further comprising:
    determining whether an area monitored by the monitoring device is associated with a light level less than a light level threshold; and
    selecting not to perform the retrieving a trend-based motor position setting, the selecting a starting motor position setting, the performing a just noticeable difference modification, and the selecting a temperature adjusted motor position setting, when the area monitored by the monitoring device is associated with a light level less than the light level threshold.

5. The method of claim 1, wherein retrieving the trend-based motor position setting for a focus motor from a trend statistics memory based on the current temperature includes:
    retrieving a plurality of motor position settings associated with the current temperature from the trend statistics memory; and
    averaging the plurality of retrieved motor position settings to determine the trend-based motor position setting.

6. The method of claim 1, wherein selecting the starting motor position setting for the focus motor, based on the retrieved trend-based motor position setting or a current motor position setting, includes:
    determining that the trend-based motor position setting does not include a value or that the trend-based motor position setting corresponds to the current motor position setting; and
    selecting the current motor position setting as the starting motor position setting, when the trend-based motor position setting does not include a value or when the trend-based motor position setting corresponds to the current motor position setting.

7. The method of claim 1, wherein selecting the starting motor position setting for the focus motor, based on the retrieved trend-based motor position setting or a current motor position setting, includes:
    determining that the trend-based motor position setting does not correspond to the current motor position setting;
    determining a current focus value for the current motor position setting, when the trend-based motor position setting does not correspond to the current motor position setting;
    determining a trend-based focus value for the current motor position setting, when the trend-based motor position setting does not correspond to the current motor position setting;
    determining whether the current focus value is greater than the trend-based focus value;
    selecting the current motor position setting as the starting motor position setting and clearing entries associated with the current temperature in the trend statistics memory, in response to determining that the current focus value is greater than the trend-based focus value; and selecting the trend-based motor position setting as the starting motor position setting, in response to determining that the current focus value is not greater than the trend-based focus value.

8. The method of claim 1, wherein performing the just noticeable difference modification on the focus motor from the selected starting motor position setting, includes:

determining a starting focus value for the selected starting motor position setting;

moving the focus motor in a first direction by a just noticeable difference value from the selected starting motor position setting to a second motor position setting;

determining a focus value associated with each motor step from the starting position to the second motor position setting to generate a first set of focus values;

moving the focus motor in a second direction by a just noticeable difference value from the selected starting motor position to a third motor position setting;

determining a focus value associated with each motor step from the starting position to the third motor position setting to generate a second set of focus values;

determining a highest focus value from the starting focus value, the first set of focus values, and the second set of focus values; and wherein selecting the temperature adjusted motor position setting for the focus motor based on a result of the just noticeable difference modification includes:

selecting a motor position associated with the determined highest focus value; and storing, in the trend statistics memory, a weighted value based on the selected starting motor position setting and the selected motor position associated with the determined highest focus value.

9. A monitoring device comprising:

a sensor array;

a focus lens configured to focus an image onto the sensor array;

a focus motor configured to adjust a focus between the focus lens and the sensor array; and logic configured to:

detect a temperature change, greater than a temperature change threshold, from a previous temperature to a current temperature;

retrieve a trend-based motor position setting for the focus motor from a memory based on the current temperature;

select a starting motor position setting for the focus motor based on the retrieved trend-based motor position setting or a current motor position setting;

perform a just noticeable difference modification on the focus motor from the selected starting motor position setting, wherein the just noticeable difference corresponds to a smallest number of steps in a motor position setting that results in a perceivable change in a focus level of images captured by the monitoring device; and select a temperature adjusted motor position setting for the focus motor based on a result of the just noticeable difference modification.

10. The monitoring device of claim 9, wherein the focus motor is configured to move the sensor array.

11. The monitoring device of claim 9, wherein the logic is further configured to:

determine whether an area monitored by the monitoring device includes an amount of movement greater than a movement threshold; and select not to retrieve a trend-based motor position setting, select a starting motor position setting, perform a just noticeable difference modification, and select a temperature adjusted motor position setting, when the area monitored by the monitoring device includes an amount of movement greater than the movement threshold.

12. The monitoring device of claim 9, wherein the logic is further configured to:

determine whether an area monitored by the monitoring device is associated with a light level less than a light level threshold; and select not to retrieve a trend-based motor position setting, select a starting motor position setting, perform a just noticeable difference modification, and select a temperature adjusted motor position setting, when the area monitored by the monitoring device is associated with a light level less than the light level threshold.

13. The monitoring device of claim 9, wherein, when the logic is configured to retrieve the trend-based motor position setting for a focus motor from a memory based on the current temperature, the logic is further configured to:

retrieve a plurality of motor position settings associated with the current temperature from the memory; and average the plurality of retrieved motor position settings to determine the trend-based motor position setting.

14. The monitoring device of claim 9, wherein, when the logic is configured to select the starting motor position setting for the focus motor based on the retrieved trend-based motor position setting or a current motor position setting, the logic is further configured to:

determine that the trend-based motor position setting corresponds to no setting or that the trend-based motor position setting corresponds to the current motor position setting; and select the current motor position setting as the starting motor position setting, when the trend-based motor position setting corresponds to no setting or when the trend-based motor position setting corresponds to the current motor position setting.

15. The monitoring device of claim 9, wherein, when the logic is configured to select the starting motor position setting for the focus motor based on the retrieved trend-based motor position setting or a current motor position setting, the logic is further configured to:

determine that the trend-based motor position setting does not correspond to the current motor position setting;

determine a current focus value for the current motor position setting, when the trend-based motor position setting does not correspond to the current motor position setting;

determine a trend-based focus value for the current motor position setting, when the trend-based motor position setting does not correspond to the current motor position setting;

determine whether the current focus value is greater than the trend-based focus value;

select the current motor position setting as the starting motor position setting and clearing entries associated with the current temperature in the memory, when the current focus value is greater than the trend-based focus value; and select the trend-based motor position setting as the starting motor position setting, when the current focus value is not greater than the trend-based focus value.

16. The monitoring device of claim 9, wherein, when the logic is configured to perform the just noticeable difference modification on the focus motor from the selected starting motor position setting, the logic is further configured to:
- determine a starting focus value for the selected starting motor position setting;
- move the focus motor in a first direction by a just noticeable difference value from the selected starting motor position setting to a second motor position setting;
- determine a focus value associated with each motor step from the starting position to the second motor position setting to generate a first set of focus values;
- move the focus motor in a second direction by a just noticeable difference value from the selected starting motor position to a third motor position setting;
- determine a focus value associated with each motor step from the starting position to the third motor position setting to generate a second set of focus values;
- determine a highest focus value from the starting focus value, the first set of focus values, and the second set of focus values; and
- wherein, when the logic is configured to select the temperature adjusted motor position setting for the focus motor based on a result of the just noticeable difference modification, the logic is further configured:
- select a motor position associated with the determined highest focus value; and
- store, in the memory, a weighted value based on the selected starting motor position setting and the selected motor position associated with the determined highest focus value.

17. A controller device comprising:
logic configured to:
- detect a temperature change, greater than a temperature change threshold, from a previous temperature to a current temperature;
- retrieve a trend-based motor position setting for a focus motor from a memory based on the current temperature;
- select a starting motor position setting for the focus motor based on the retrieved trend-based motor position setting or a current motor position setting;
- perform a just noticeable difference modification on the focus motor from the selected starting motor position setting, wherein the just noticeable difference corresponds to a smallest number of steps in a motor position setting that results in a perceivable change in a focus level of captured images; and
- select a temperature adjusted motor position setting for the focus motor based on a result of the modification.

18. The controller device of claim 17, wherein when the logic is configured to select the starting motor position setting for the focus motor based on the retrieved trend-based motor position setting or a current motor position setting, the logic is further configured to:
- determine that the trend-based motor position setting corresponds to no setting or that the trend-based motor position setting corresponds to the current motor position setting; and
- select the current motor position setting as the starting motor position setting, when the trend-based motor position setting corresponds to no setting or when the trend-based motor position setting corresponds to the current motor position setting.

19. The controller device of claim 17, wherein when the logic is configured to select the starting motor position setting for the focus motor based on the retrieved trend-based motor position setting or a current motor position setting, the logic is further configured to:
- determine that the trend-based motor position setting does not correspond to the current motor position setting;
- determine a current focus value for the current motor position setting, when the trend-based motor position setting does not correspond to the current motor position setting;
- determine a trend-based focus value for the current motor position setting, when the trend-based motor position setting does not correspond to the current motor position setting;
- determine whether the current focus value is greater than the trend-based focus value;
- select the current motor position setting as the starting motor position setting and clearing entries associated with the current temperature in the memory, when the current focus value is greater than the trend-based focus value; and
- select the trend-based motor position setting as the starting motor position setting, when the current focus value is not greater than the trend-based focus value.

20. The controller device of claim 17, wherein, when the logic is configured to perform the just noticeable difference modification on the focus motor from the selected starting motor position setting, the logic is further configured to:
- determine a starting focus value for the selected starting motor position setting;
- move the focus motor up by a just noticeable difference value from the selected starting motor position setting to a second motor position setting;
- determine a focus value associated with each motor step from the starting position to the second motor position setting to generate a first set of focus values;
- move the focus motor down by a just noticeable difference value from the selected starting motor position to a third motor position setting;
- determine a focus value associated with each motor step from the starting position to the third motor position setting to generate a second set of focus values;
- determine a highest focus value from the starting focus value, the first set of focus values, and the second set of focus values; and
- wherein, when the logic is configured to select the temperature adjusted motor position setting for the focus motor based on a result of the modification, the logic is further configured:
- select a motor position associated with the determined highest focus value; and
- store, in a memory, a weighted value based on the selected starting motor position setting and the selected motor position associated with the determined highest focus value.

* * * * *